US011813964B2

(12) United States Patent
Audhav et al.

(10) Patent No.: US 11,813,964 B2
(45) Date of Patent: Nov. 14, 2023

(54) BRAKING SYSTEM, FUEL CELL SYSTEM, AND VEHICLE COMPRISING FUEL CELL SYSTEM

(71) Applicant: Volvo Truck Corporation, Gothenburg (SE)

(72) Inventors: Tove Audhav, Landvetter (SE); Fredrik Rahm, Hörby (SE); Vijai Shankar Bhavani Shankar, Mölndal (SE)

(73) Assignee: Volvo Truck Corporation, Gothenburg (SE)

( * ) Notice: Subject to any disclaimer, the term of this patent is extended or adjusted under 35 U.S.C. 154(b) by 46 days.

(21) Appl. No.: 17/689,238

(22) Filed: Mar. 8, 2022

(65) Prior Publication Data
US 2022/0305918 A1 Sep. 29, 2022

(30) Foreign Application Priority Data
Mar. 26, 2021 (EP) ..................... 21165291

(51) Int. Cl.
*B60L 7/02* (2006.01)
*B60L 50/70* (2019.01)

(52) U.S. Cl.
CPC ................. *B60L 7/02* (2013.01); *B60L 50/70* (2019.02)

(58) Field of Classification Search
CPC .. B60L 7/02; B60L 50/70; B60L 58/34; B60L 7/22; B60K 6/32; H01M 8/04701; B60H 1/00; B60W 30/18

(Continued)

(56) References Cited

U.S. PATENT DOCUMENTS 6,488,345 B1  12/2002 Woody et al.
6,986,727 B2 *  1/2006 Kuras ................... B60W 10/08
                                                    477/4

(Continued)

FOREIGN PATENT DOCUMENTS

DE  102018202034 A1  8/2019
DE  102019200921 A1  7/2020

(Continued)

OTHER PUBLICATIONS

Machine Translation of RU 2706865 C1 accessed at www.espacenet.com on Jun. 16, 2023. (Year: 2019).*

(Continued)

*Primary Examiner* — John D Walters
*Assistant Examiner* — Hilary L Johns
(74) *Attorney, Agent, or Firm* — Withrow & Terranova, PLLC

(57) ABSTRACT

The present invention relates to a braking system for a vehicle at least partially propelled by an electric traction motor, the braking system comprising an electric machine electrically connected to an electric source; an air flow producing unit mechanically connected to, and operated by, the electric machine; and an electrical brake resistor arrangement positioned in fluid communication between the air flow producing unit and an ambient environment, the electrical brake resistor arrangement being electrically connected to the electric source and arranged to heat air supplied from the air flow producing unit by electrical power received from the electric source, and to supply heated air to the ambient environment.

16 Claims, 4 Drawing Sheets

(58) Field of Classification Search
USPC .................................................. 180/65.31
See application file for complete search history.

(56) References Cited

U.S. PATENT DOCUMENTS

| | | | |
|---|---|---|---|
| 11,529,941 B2* | 12/2022 | Books | B60K 6/448 |
| 2005/0137060 A1* | 6/2005 | Kuras | B60L 7/22 |
| | | | 477/214 |
| 2006/0046895 A1* | 3/2006 | Thacher | B60L 58/40 |
| | | | 477/4 |
| 2011/0125351 A1 | 5/2011 | Bauerle | |
| 2015/0183338 A1 | 7/2015 | Lee et al. | |
| 2019/0181467 A1 | 6/2019 | Farnsworth | |

FOREIGN PATENT DOCUMENTS

| | | | |
|---|---|---|---|
| RU | 2706865 C1 * | 11/2019 | |
| RU | 2706865 C1 | 11/2019 | |
| WO | 12128770 A1 | 9/2012 | |

OTHER PUBLICATIONS

Extended European Search Report for European Patent Application No. 21165291.2, dated Feb. 7, 2022, 23 pages.

\* cited by examiner

BRAKING SYSTEM, FUEL CELL SYSTEM, AND VEHICLE COMPRISING FUEL CELL SYSTEM

RELATED APPLICATIONS

The present application claims priority to European Patent Application No. 21165291.2, filed on Mar. 26, 2021, and entitled "BRAKING SYSTEM, FUEL CELL SYSTEM, AND VEHICLE COMPRISING FUEL CELL SYSTEM," which is incorporated herein by reference in its entirety.

TECHNICAL FIELD

The present invention relates to a braking system for a vehicle at least partially propelled by an electric traction motor. The present invention also relates to a fuel cell system comprising such a braking system, as well as a vehicle comprising such a fuel cell system. Although the invention will mainly be directed to a vehicle in the form of a truck using a fuel cell for generating electric power to an electric traction motor, the invention may also be applicable for other types of vehicles at least partially propelled by an electric traction motor, such as e.g., an electric vehicle, a hybrid vehicle comprising an electric machine as well as an internal combustion engine for propulsion.

BACKGROUND

The propulsion systems of vehicles are continuously developed to meet the demands from the market. A particular aspect relates to the emission of environmentally harmful exhaust gas. Therefore, vehicles propelled by electric machines and/or electric machine receiving electric power from hydrogen fuel cells have been increasingly popular, in particular for trucks and other heavy duty vehicles.

In comparison to a vehicle propelled solely by an internal combustion engine (ICE), a vehicle propelled by an electric machine conventionally struggles with obtaining the desired functionality of auxiliary braking. For an ICE operated vehicle, the auxiliary braking can be achieved by means of a retarder, etc. However, for an electric vehicle, the auxiliary braking functionality can be a dimensioning factor for the cooling system since the cooling capacity of e.g. a fuel cell electric vehicle (FCEV) as well as a battery electric vehicle (BEV) is a limiting factor. The reason is that for such type of vehicles, the auxiliary braking places a lot of energy in the cooling system.

There is thus a desire to provide a braking system for a vehicle which is at least partially propelled by an electric traction motor, which braking system puts less strain to the vehicle cooling system.

SUMMARY

It is thus an object of the present invention to at least partially overcome the above described deficiencies.

According to a first aspect, there is provided a braking system for a vehicle at least partially propelled by an electric traction motor, the braking system comprising an electric machine electrically connected to an electric source; an air flow producing unit mechanically connected to, and operated by, the electric machine; and an electrical brake resistor arrangement positioned in fluid communication between the air flow producing unit and an ambient environment, the electrical brake resistor arrangement being electrically connected to the electric source and arranged to heat air supplied from the air flow producing unit by electrical power received from the electric source, and to supply heated air to the ambient environment.

The electric source should be construed as being, for example, a battery connected to the electric machine. The electric source could also be a fuel cell stack arranged to generate electric power, a capacitor, an inverter, or a generator, etc. arranged in connection with the electric machine. Further, the wording "supply heated air to the ambient environment" should be construed such that the heated air is exhausted to the ambient environment.

Furthermore, the electrical brake resistor arrangement should be construed as comprising at least an electrical brake resistor. The electrical brake resistor arrangement may however comprise further components, such as e.g. a heat exchanger, e.g. a heat exchanger forming a liquid cooled resistor. Such heat exchanger can be positioned either upstream or downstream the electrical brake resistor as seen in the air flow direction from the air flow producing unit, and/or be integrated in the resistor. The electrical brake resistor arrangement may also comprise other components such as e.g. turbulators and/or flow directors, etc. As will also be described further below, the electrical brake resistor arrangement may be integrally formed with an air flow restriction arrangement and/or a muffler. Various electrical brake resistor arrangements are thus conceivable.

Still further, the air flow producing unit should be construed as a unit arranged to receive air and blow the air towards the electrical brake resistor arrangement. The air flow producing unit may, for example, be a fan arranged to receive air which is blown towards the electrical brake resistor arrangement. As an alternative, and according to an example embodiment, the air flow producing unit may be an air compressor arranged to compress the received air and transmit the compressed air to the electrical brake resistor arrangement.

The inventors have realized that by using an electrical brake resistor arrangement receiving air from the air flow producing unit, the energy from the electric source can be supplied to the air flow producing unit as well as to the electrical brake resistor arrangement which, by means of the received electricity, heats the air and releases it to the ambient environment. The air received into the electrical brake resistor arrangement is thus heated and a braking action is performed by the braking system. The heated air can in turn be used to lower the cooling demands of a cooling system for the vehicle, thereby even further assist the cooling system. Thus, by means of the air directed into the braking system, heated coolant can be cooled, e.g. the temperature of the coolant of the vehicle's cooling system can be reduced, whereby the heated air is exhausted to the ambient environment. The intake air can also be arranged for direct cooling of vehicle components, or supplied to e.g. a heat exchanging process.

The present invention is thus advantageously "burning off" electric energy for performing a braking operation of the vehicle, whereby the electric energy gained during such an event is placed into a raised temperature of air in the electrical brake resistor arrangement. The present invention is particularly advantageous when e.g. a vehicle battery is full and the cooling system has reached its limit, i.e. the cooling system is unable to provide any cooling. A further advantage is thus that the existing cooling system can be downsized.

Furthermore, in the above described embodiment of using an air compressor as the air flow producing unit, the air compressor can also receive the electric energy which is placed into an increased pressure of the air, as well as an increased temperature level of the air. Furthermore, the air compressor can provide air at a suitable high pressure level that can reduce the packaging size of the resistor arrangement, since heat transfer between the air intake and the brake resistor arrangement is increased. Also, heat transfer will be increased with higher pressure level and air flow velocity. In addition, the specific heat transfer coefficient will increase with an increased temperature level. An air compressor can also be provided as a relatively small component fulfilling the desires of creating sufficient increase in pressure and mass flows. An air compressor is also consuming a relatively high level of power when compressing the air, thus improving the energy dissipation.

According to an example embodiment, the braking system may further comprise an air heating arrangement positioned in fluid communication with, and upstream, the air flow producing unit for heating the air supplied to the air flow producing unit.

The inventors have also unexpectedly realized that by increasing the temperature of the air before it reaches the air flow producing unit will enable the air flow producing unit as well as the electrical brake resistor arrangement to supply and "burn off" an even further amount of electric energy from the electric source, thereby increasing the brake capacity even further as the cooling system will be less strained during a braking event. As indicated above, the overall cooling demand for the vehicle can hereby be reduced.

According to an example embodiment, the air heating arrangement may be formed by the electric machine, wherein air is received, and heated, by the electric machine and supplied to the air flow producing unit. Hereby, the electric machine will in turn be cooled, thereby presenting a combined technical advantage. As an alternative, and according to an example embodiment, the air heating arrangement may be formed by a heat exchanger connected to a liquid cooling system. Also, an air fan or additional compressor can be positioned upstream the electric machine. Hence, air is received by the air fan or additional compressor before supplied to the electric machine. A pre-boosting of the air is generated which makes the potential power density for the electric machine more efficient, i.e., increased, whereby the above described air flow producing unit can also be downsized.

According to an example embodiment, the electrical brake resistor arrangement may be an air cooled electrical brake resistor. The electrical brake resistor arrangement is thus cooled by the air it receives from the air flow producing unit when receiving electric power. Other alternatives are also conceivable, such as e.g., a liquid cooled brake resistor arrangement receiving liquid cooling from e.g. the liquid cooling system of the vehicle, etc. According to a non-claimed embodiment, the resistor can be arranged upstream the compressor. As a further alternative, the braking system can comprise one resistor upstream the compressor and one resistor downstream the compressor.

According to an example embodiment, the braking system may further comprise an air flow restriction arrangement positioned downstream the electrical brake resistor arrangement. The air flow restriction arrangement here assists the braking system to keep the air pressure level at a suitable pressure level for obtaining a desired braking effect.

According to an example embodiment, the air flow restriction arrangement may comprise a muffler. A muffler may be advantageously incorporated in the braking system to lower temperature and noise of the exhaust air. The muffler can function as a static flow restriction component or it can be arranged in series to an additional flow restriction. The flow restriction arrangement and the muffler may be formed in a single component. Also, the electrical brake resistor be arranged within the muffler. Furthermore, the muffler may preferably comprise a temperature management arrangement for reducing the temperature level of the exhausted air to the ambient environment. Such temperature management arrangement may comprise a thermal insulation, a cooling circuitry, a heat exchanger, and/or a blend of low temperature air mixed with the relatively high temperature air received from the electrical brake resistor arrangement.

According to an example embodiment, the electrical brake resistor arrangement may be integrally formed with the air flow restriction arrangement.

According to an example embodiment, the braking system may further comprise a control unit connected to the electric source and the electric machine, the control unit being configured to receive a signal indicative of a current energy dissipation request from the electric source, and when the electric source requests dissipation of energy control the electric machine to propel the air flow producing unit for producing a flow of air to the electrical brake resistor arrangement; and control the electric source to supply electric power to the electrical brake resistor arrangement for heating the air received by the electrical brake resistor.

The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

The control unit is thus advantageously controlling operation of the electric source as well as the electric machine when there is a desire to dissipate energy from the electric source.

According to an example embodiment, the current energy dissipation request may be based on a desired energy level of the electric source at an upcoming driving position for the vehicle, wherein, before the vehicle arrives at the upcoming driving position, the control unit is configured to control the electric machine to propel the air flow producing unit for producing a flow of air to the electrical brake resistor arrangement; and control the electric source to supply electric power to the electrical brake resistor arrangement for heating the air received by the electrical brake resistor.

Thus, based on the upcoming driving position, such as an upcoming driving situation, based on e.g., speed limits, altitude etc., the control unit can determine the level of energy that will be obtained by the electric source at that upcoming driving position. Hereby, energy dissipation can be made before arriving at the upcoming driving position and the electric source is thus able to receive electric power. The power dissipation is thus made in advance to enable e.g., a battery to receive electric power.

According to an example embodiment, the control unit may be further configured to determine, based on the current energy dissipation request, an amount of energy to dissipate; determine a first maximum operational power level of the air flow producing unit; determine a second maximum operational power level of the electrical brake resistor arrangement; and control the electric machine and the electrical brake resistor arrangement to dissipate the amount of energy without exceeding the first and second maximum operational power levels.

Hereby, it can be assured that neither one of the air flow producing unit and the electrical brake resistor arrangement will not exceed its maximum operational level, thereby increasing their operational lifetime. Also, an optimization can hereby be performed where the air flow producing unit as well as the electrical brake resistor arrangement can be controlled to operate within a predetermined operational range, respectively. The predetermined operational range is thus the operational range for the respective component at which they are most efficient.

According to an example embodiment, the control unit may be further configured to receive a signal indicative of a braking request for the vehicle, and control the electric machine to propel the air flow producing unit and the electric source to supply electric power to electrical brake resistor arrangement when the vehicle requests braking.

Hereby, the control unit controls the electric machine and the electrical brake resistor arrangement to operate the braking system as an auxiliary brake system.

According to a second aspect, there is provided a fuel cell system, comprising a fuel cell stack arrangement comprising an air inlet side for receiving air to the fuel cell stack arrangement via an air inlet conduit; and a braking system according to any one of the above described embodiments of the first aspect, wherein the air flow producing unit is connected to the air inlet conduit at a position upstream the fuel cell stack arrangement.

The above described braking system is thus particularly advantageously incorporated in a fuel cell system. The fuel cell stack arrangement comprises a fuel cell stack, and can also comprise other components such as a humidifier, by-pass valves, charge air cooler(s), etc.

According to an example embodiment, the fuel cell system may further comprise a fuel cell air flow producing unit connected to the air inlet conduit upstream the fuel cell stack arrangement, and a fuel cell electric motor mechanically connected to the fuel cell air flow producing unit, wherein the air flow producing unit is connected to the air inlet conduit at a position downstream the fuel cell air flow producing unit.

The braking system in combination with the fuel cell system can hereby provide a synergetic effect. If the braking system is incorporated into the fuel cell system, the two air systems can thereby manage high mass flows with the air flow producing unit of the brake system while the fuel cell air flow producing unit can be downsized and optimized for the lower mass flows. This would contribute to higher fuel cell efficiency during low load operation. Since the fuel cell is most frequently operated at low loads, this setup improves the overall cycle fuel consumption.

The fuel cell air flow producing unit and the air flow producing unit of the braking system are thus two separate components arranged at different positions. The fuel cell air flow producing unit may preferably be a fuel cell compressor.

According to an example embodiment, the electrical brake resistor arrangement may be arranged in downstream fluid communication with the fuel cell air flow producing unit.

Hereby, the electrical brake resistor arrangement is arranged to receive air also from the fuel cell air flow producing unit. Preferably, a valve is arranged in fluid communication between the fuel cell air flow producing unit and the electrical brake resistor arrangement, whereby the valve is preferably controlled by the above described control unit for controllably supplying air from the fuel cell air flow producing unit to the electrical brake resistor arrangement. It should be noted that the fuel cell air flow producing unit can be used as the air flow producing unit described above in relation to the first aspect. Thus, the air is supplied from the fuel cell air flow producing unit to the electrical brake resistor arrangement.

Further effects and features of the second aspect are largely analogous to those described above in relation to the first aspect.

According to a third aspect, there is provided an electrically propelled vehicle comprising a fuel cell system according to any one of the embodiments described above in relation to the second aspect, wherein the electrically propelled vehicle is arranged to receive electric power from the fuel cell system.

The fuel cell system can hereby deliver electric energy directly to the traction motors of the vehicle, particularly for a so-called parallel hybrid vehicle. The electric energy generated by the fuel cell system can on the other hand also be provided to the traction electric motor via e.g., a battery.

Effects and features of the third aspect are largely analogous to those described above in relation to the first and second aspects.

According to a fourth aspect, there is provided a braking system for a vehicle at least partially propelled by an electric traction motor, the braking system comprising an air flow producing unit configured to generate a flow of air; and an electrical brake resistor arrangement positioned downstream the air flow producing unit and arranged to receive the flow of air generated by the flow producing unit, the electrical brake resistor arrangement being electrically connected to an electric source, wherein the electric source is configured to supply electric power to the electrical brake resistor arrangement to heat the air received by the electrical brake resistor arrangement from the air flow producing unit.

Effects and features of the fourth aspect are largely analogous to those described above in relation to the first and second aspect.

It should be readily understood that all features and embodiments of the above described various aspects can be combined with the features of another aspect of the present invention.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

The above, as well as additional objects, features, and advantages, will be better understood through the following illustrative and non-limiting detailed description of exemplary embodiments, wherein.

DETAILED DESCRIPTION

Figure 1:
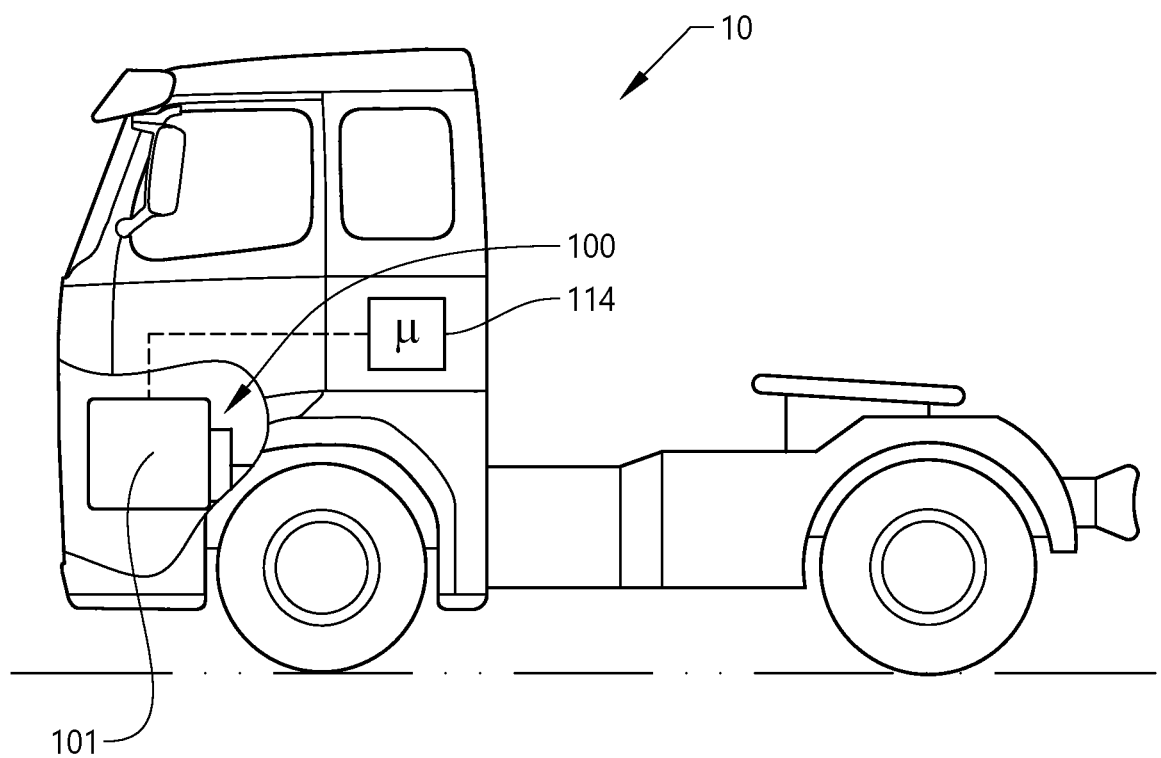
FIG. 1 is a lateral side view illustrating an example embodiment of a vehicle in the form of a truck.

The present invention will now be described more fully hereinafter with reference to the accompanying drawings, in which exemplary embodiments are shown. The invention may, however, be embodied in many different forms and should not be construed as limited to the embodiments set forth herein; rather, these embodiments are provided for thoroughness and completeness. Like reference character refer to like elements throughout the description.

With particular reference to FIG. 1, there is depicted a vehicle 10 in the form of a truck. The vehicle comprises a traction motor 101 for propelling the wheels of the vehicle. The traction motor 101 is in the example embodiment an electric machine arranged to receive electric power from a battery or directly from a fuel cell system which is described in further detail below. The vehicle 10 also comprises a control unit 114 for controlling various operations as will also be described in further detail below, and a braking system (not shown in detail in FIG. 1) arranged to dissipate electric energy for obtaining an auxiliary braking action for the vehicle.

Figure 2:
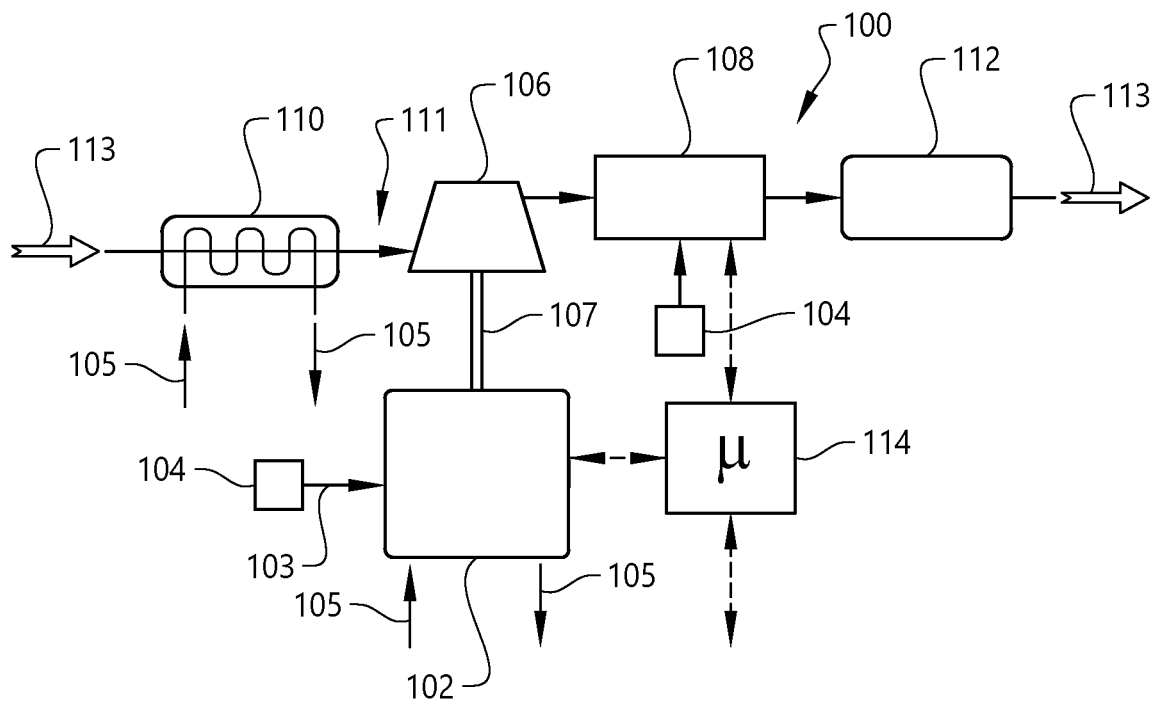
FIG. 2 is a schematic illustration of a braking system according to an example embodiment.

In order to describe the braking system in further detail, reference is made to FIG. 2 which is a schematic illustration of a braking system according to an example embodiment. The braking system 100 depicted in FIG. 2 comprises an electric machine 102 arranged to receive electric power 103 from an electric source 104. The electric source 104 can be, for example, a vehicle battery or a fuel cell system as is described in further detail below with reference to FIG. 4. The electric source 104 can, as another option, be formed by an electric inverter, or other electric machine, etc. Thus, the purpose of the electric source is to supply electric power to the electric machine. The electric source can, according to an example, also be arranged to receive electric power from the traction motor 101 of the vehicle. Moreover, the electric machine 102 can also be connected to a cooling system 105 of the vehicle 10. The cooling system 105 may either be a liquid cooling system or an air cooling system.

The braking system 100 further comprises an air flow producing unit 106 mechanically connected to, and operated by, the electric machine 102. Preferably, the air flow producing unit 106 is mechanically connected to the electric machine 102 by a shaft 107. The air flow producing unit 106 serves, amongst other things, the purpose of supplying a flow of air 113. The air flow producing unit 106 can thus be formed by various arrangements to serve such purpose. The air flow producing unit 106 is thus preferably arranged to also significantly increase the pressure level of the air, as well as to increase the temperature level and flow velocity of the air. According to examples, the air flow producing unit 106 can be an air fan or a compressor. For simplifying the description of the various example embodiments of the present invention, the air flow producing unit 106 will in the following be referred to as a compressor 106 or a brake compressor 106.

The brake compressor 106 is arranged in an air flow line 111 of the braking system 100. The braking system 100 further comprises an electrical brake resistor arrangement 108 in the air flow line 111. The electrical brake resistor arrangement 108 is arranged in downstream fluid communication with the brake compressor 106 and thus receives the air flow from the brake compressor 106. The electrical brake resistor arrangement 108 comprises an electrical brake resistor and is electrically connected to the above described electric source 104. In FIG. 2, the electric source 104 is thus depicted as two components for simplicity of understanding. It should be readily understood that the electric source could be either a single component or separate components. The electrical brake resistor arrangement 108 thus receives the air from the brake compressor, whereby the air is heated by in the electrical brake resistor by the electric power received from the electric source 104. The air is thereafter supplied to the ambient environment. According to the example embodiment depicted in FIG. 2, the braking system 100 may also comprise an air flow restriction arrangement 112 between the electrical brake resistor arrangement 108 and the ambient environment for maintaining a suitable pressure level within the braking system. The air flow restriction arrangement 112 may comprise a muffler.

Still further, the braking system 100 exemplified in FIG. 2 comprises an air heating arrangement 110 arranged in upstream fluid communication with the brake compressor 106. The air heating arrangement 110 is in FIG. 2 arranged by a heat exchanger connected to the cooling system of the vehicle 10. Thus, the heat exchanger receives liquid fluid from the cooling system and pre-heats the air before it is delivered to the brake compressor 106. The heat exchanger 110 is thus preferably an air-to-liquid heat exchanger but may, as an alternative, be an air-to-air heat exchanger which uses relatively warm air to heat the air that is supplied to the brake compressor 106.

The braking system 100 also comprises the above described control unit 114. The control unit 114 is preferably connected to the electric machine 102 and the electrical brake resistor arrangement 108. Hereby, the control unit 114 can control operation of these components. The control unit 114 should however be construed as being connected/connectable to other components of the braking system, such as to the electric source 104 and to the brake compressor 106. The control unit 114 and functional operations thereof will be described in further detail below.

The control unit 114 preferably comprises processing circuitry including a microprocessor, microcontroller, programmable digital signal processor or another programmable device. The processing circuitry may also, or instead, include an application specific integrated circuit, a programmable gate array or programmable array logic, a programmable logic device, or a digital signal processor. Where the processing circuitry includes a programmable device such as the microprocessor, microcontroller or programmable digital signal processor mentioned above, the processor may further include computer executable code that controls operation of the programmable device. It should be understood that all or some parts of the functionality provided by means of the processing circuitry may be at least partly integrated with a e.g. a primary vehicle control unit, or other control units of the vehicle, which is/are arranged to detect an upcoming traffic situation, road topology, etc. The information from the primary vehicle control unit can thus be transmitted to the above described control unit 114 for decision making of the control unit 114.

By means of the braking system 100 depicted in FIG. 2 and described above, electric power from the electric source 104 is dissipated by electrifying the brake compressor 106 and the electrical brake resistor arrangement 108, whereby the electric power for the brake compressor 106 as well as for the electrical brake resistor arrangement 108 heats is used for heating the air. The electric power is thus dissipated into the air which is released to the ambient environment.

Figure 3:
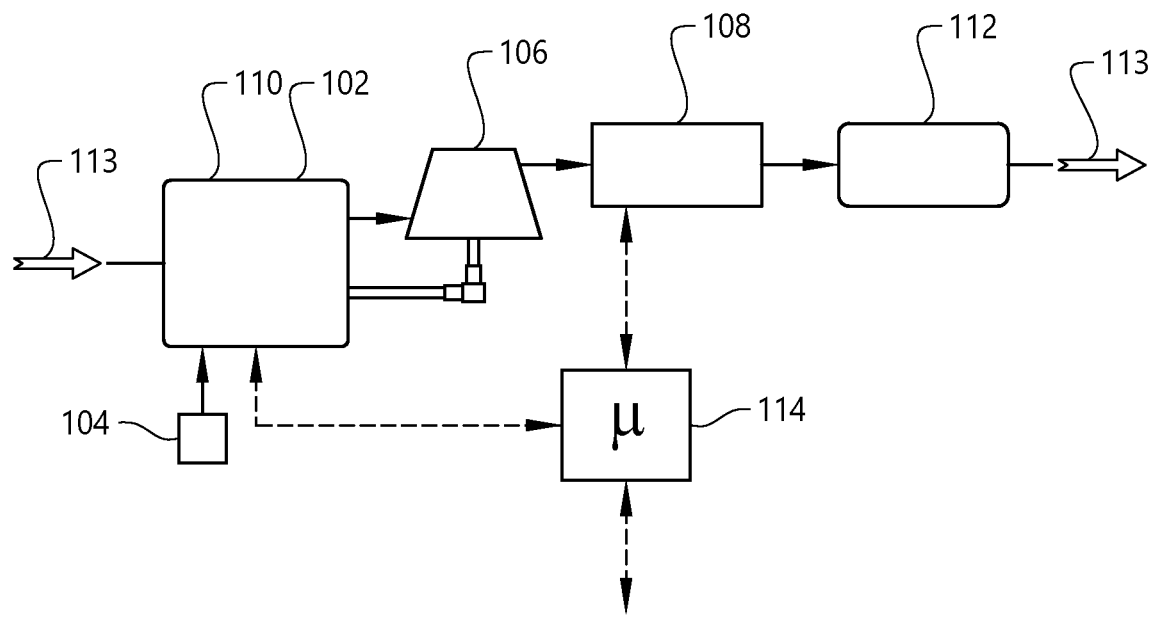
FIG. 3 is a schematic illustration of a braking system according to another example embodiment.

In order to describe another example embodiment, reference is made to FIG. 3 which is a schematic illustration of a braking system according to another example embodiment. The example embodiment depicted in FIG. 3 contains features similar to the example embodiment depicted in FIG. 2. As such, only features that are different from FIG. 2 will be described unless specified otherwise.

As can be seen, the example embodiment depicted in FIG. 3 does not contain the above described heat exchanger. Instead, the air heating arrangement 110 is formed by the electric machine 102. Hereby, air is received, and heated, by the electric machine 102 before delivery to the brake compressor 106. The electric machine 102 can also be a battery inverter motor. An inverter can thus be arranged between the battery and the motor. The inverter can be incorporated in the motor. It should be readily understood that a combination of FIG. 2 and FIG. 3 is also conceivable, where a heat exchanger is positioned in either upstream or downstream fluid communication with the electric machine 102 when the electric machine 102 is positioned as illustrated in FIG. 3.

By means of the control unit 114 depicted in FIGS. 2 and 3, the braking system can be operated in a number of manners for dissipating electric power into heated air which is released into the ambient environment. For example, the control unit can be arranged to receive a signal indicative of a current energy dissipation request from the electric source. For example, a current energy dissipation request may be based on e.g., a battery having a SOC-level above a maximum predetermined limit, whereby the battery is in need of dissipating energy. For example, the control unit may receive a signal indicative of an upcoming downhill slope where the vehicle will need to use the battery for braking and energy recuperation. In such case, the battery should preferably have a relatively low SOC-level for being able to receive electric power.

When the electric source requests dissipation of energy, the control unit 114 is arranged to control the electric machine to energize the brake compressor for compressing air and producing a flow of compressed air to the electrical brake resistor arrangement 108. The control unit 114 also controls the electrical brake resistor arrangement 108 to be energized by electric power to further heat the received compressed air. Hereby, the electric source 104 reduces its electric power level by heating the air.

The brake compressor 106 as well as the electrical brake resistor arrangement 108 may be controlled to not exceed their respective operational power level. Thus, an optimization can be controlled by the control unit for utilizing the brake compressor and the electrical brake resistor arrangement at their preferred operational points.

According to an example embodiment, the control unit 114 may be configured to receive a signal indicative of an upcoming driving situation. The control unit 114 may also receive a signal indicative of a current operational status of external systems, such as batteries and cooling system, as well as a signal indicative of a current operational status of the brake compressor 106 and the electrical brake resistor arrangement 108. The control unit may thereafter control the electric machine 102 and the electrical brake resistor arrangement 108 based on a combination of the current operational status of the external systems and the current operational status of the brake compressor 106 and the electrical brake resistor arrangement 108. Hereby, an optimization of the entire system is performed such that all components can substantially operate at their preferred operational points. Thus, the cooling system will not overheat, the battery will maintain a desired SOC-level, the brake compressor will not overspeed, and the electrical brake resistor arrangement will not overheat.

The control unit 114 thus controls the electric machine to operate the brake compressor 106, as well as controls the electrical brake resistor arrangement 108 for optimization thereof. According to another example and as also indicated above, the control unit 114 can be arranged to receive a signal indicative of a braking request for the vehicle 10. When a braking request is indicated, the control unit 114 controls the electric machine 102 to propel the brake compressor 106 and controls the electric source 104 to supply electric power to the electrical brake resistor arrangement 108.

Figure 4:
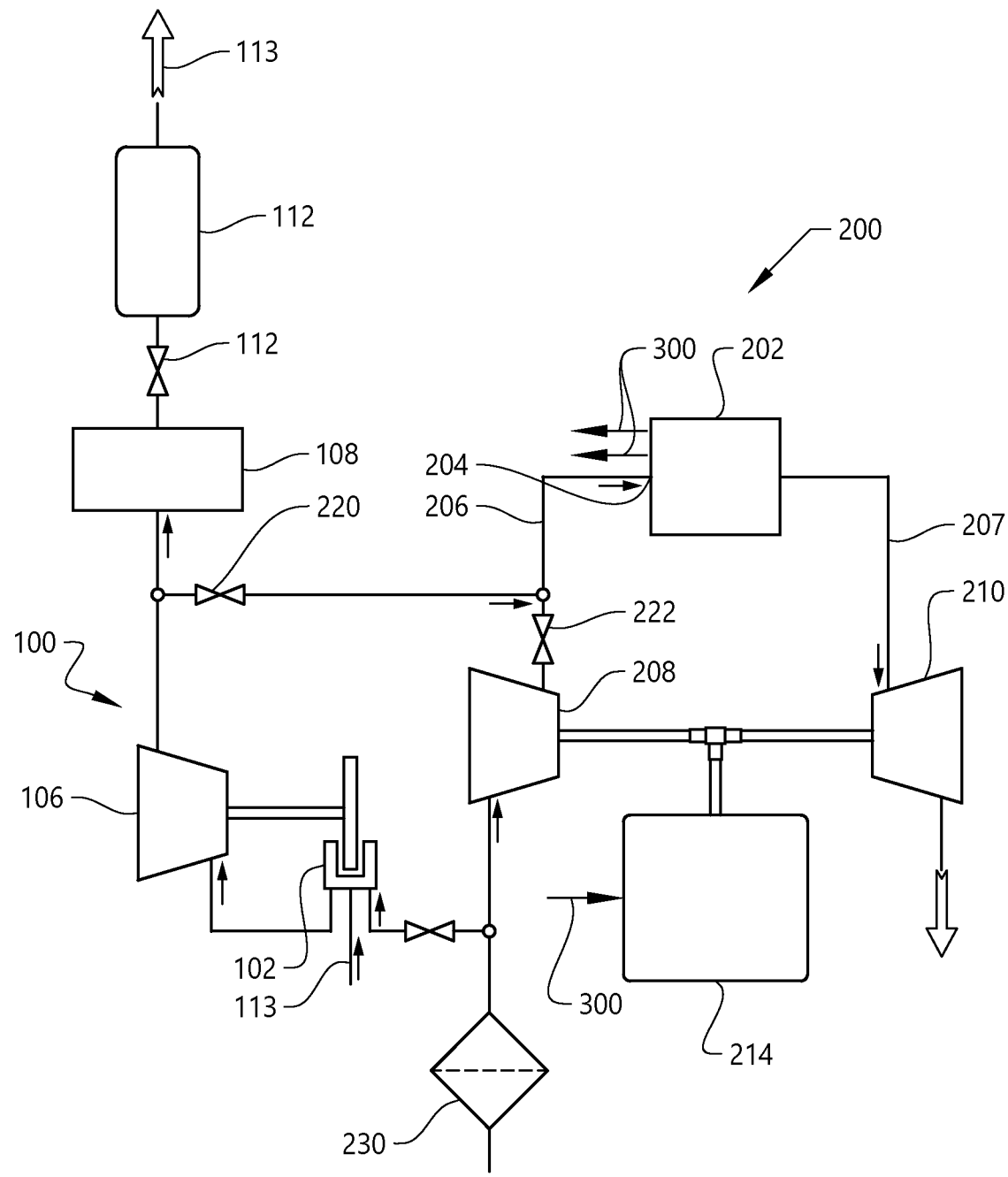
FIG. 4 is a schematic illustration of a fuel cell system according to an example embodiment.

The above described braking system 100 can be advantageously incorporated in a fuel cell system. Reference is therefore made to FIG. 4 which is a schematic illustration of a fuel cell system 200 according to an example embodiment. As can be seen in FIG. 4, the fuel cell system 200 comprises the above described braking system 100. In particular, the fuel cell system 200 comprises a fuel cell stack arrangement 202 comprising an air inlet side 204 for receiving air to the fuel cell stack arrangement via an air inlet conduit 206. The fuel cell stack arrangement 202 is thus arranged to generate electric power indicated by arrows 300. The fuel cell system 200 further comprises an air outlet conduit 207 arranged to receive air from the fuel cell stack arrangement 202. A fuel cell air flow producing unit 208, in the following referred to as a fuel cell compressor 208 is arranged in the air inlet conduit 206. A fuel cell turbine 210 is preferably arranged in the air outlet conduit 207, wherein the fuel cell compressor 208 and the fuel cell turbine 210 are mechanically connected to a fuel cell electric motor 214. The fuel cell electric motor 214 could be the traction motor of the vehicle 10, or it can be merely used for operating the fuel cell compressor 208 and the fuel cell turbine 210. It should however be readily understood that the fuel cell stack arrangement 202 can also be connected to a battery for storing the electric power generated by the fuel cell stack arrangement before delivery of electric power to the traction motor.

Air is thus received by the fuel cell compressor 208, in FIG. 4 depicted as flowing into the fuel cell compressor 208 via an air filter 230. The compressed air from the fuel cell compressor 208 is delivered into the fuel cell stack arrangement 202 where the air is used for in the electrochemical reactions in the fuel cell stack to produce electricity.

As depicted in the example embodiment of FIG. 4, the brake compressor 106 is connected to the air inlet conduit 206 at a position upstream the fuel cell stack arrangement 202. The fuel cell system 200 further comprises valves 220, 222 for controlling the flow direction of the air in the fuel cell system. As can be seen by FIG. 4, the air compressed in the brake compressor can, by controlling the valve 220 be directed to the inlet side 204 of the fuel cell stack arrangement 202. Also, the valve 222 can be arranged in a closed position to prevent air from being supplied from the fuel cell compressor 208 to the inlet side of the fuel cell stack arrangement.

The fuel cell electric motor 214 and/or the fuel cell stack arrangement 202 may thus form the above described electric source, whereby electric power is dissipated from at least one of these electric sources by using the braking system as described above. The fuel cell system may, although not depicted in FIG. 4, comprise a single valve replacing the valves 220, 222. In detail, a three-way valve may be used instead of the two valves 220, 222.

Figure 5:
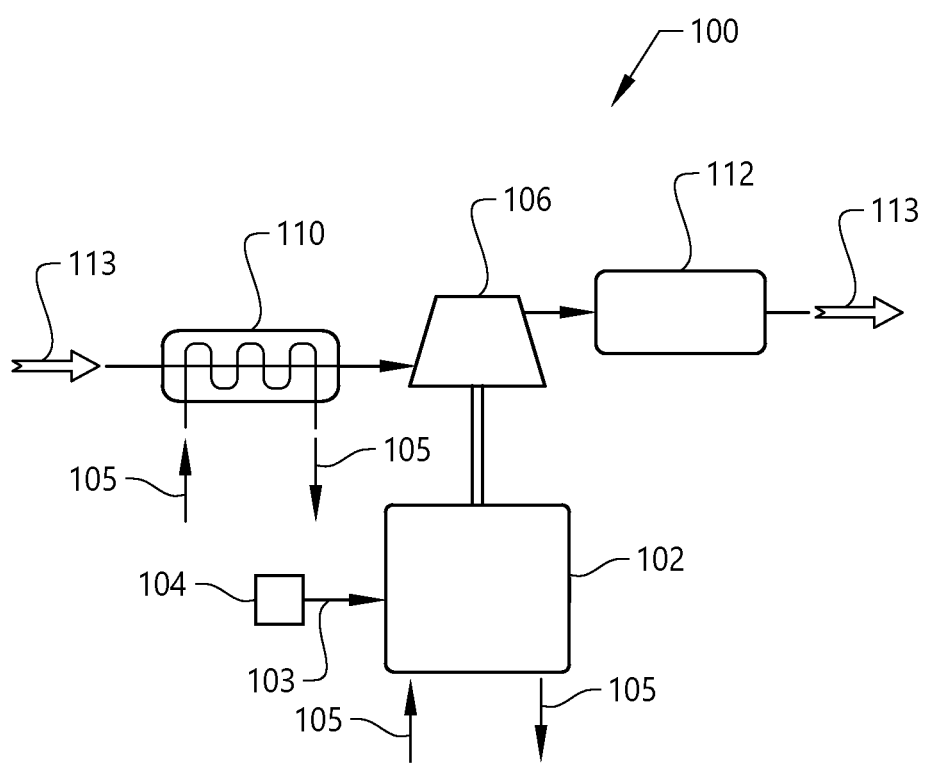
FIG. 5 is a schematic illustration of a braking system according to a still further example embodiment.

Reference is now made to FIG. 5, which illustrates a further example embodiment of the braking system 100. The main difference between the embodiment depicted in FIG. 5 and the embodiment depicted in FIG. 3 is that the embodiment in FIG. 5 does not comprise the electrical brake resistor arrangement. Conversely, the braking system 100 in FIG. 5 uses solely the brake compressor 106 for dissipating electric power 103 from the electric source 104. The example embodiment in FIG. 5 thus comprises the electric machine 102, which is electrically connected to the electric source, and the brake compressor 106 which is mechanically connected to the electric machine 102. As an option, and as indicated in FIG. 5, the braking system may also comprise the above described heat exchanger 110 and the flow restriction arrangement 112. The heat exchanger can be an air-to-liquid heat exchanger, an air-to-air heat exchanger, etc. As an alternative, and as depicted in FIG. 3, the heat exchanging process can also for the FIG. 5 embodiment be provided by using the electric machine 102 as a heat source. Air is hereby directly removing heat from the contact with the electric machine as air flows over the electric machine. Thus, in a similar manner as described above in relation to FIG. 3, the braking system 100 may use the electric machine 102 instead of the heat exchanger for increasing the temperature level of the air before the air is supplied to the brake compressor 106. The FIG. 5 embodiment hereby provides an advantageous cooling power increase for the braking system.

It is to be understood that the present disclosure is not limited to the embodiments described above and illustrated in the drawings; rather, the skilled person will recognize that many changes and modifications may be made within the scope of the appended claims.

The invention claimed is:

1. A braking system for a vehicle at least partially propelled by an electric traction motor, the braking system comprising:
    an electric machine electrically connected to an electric source;
    an air flow producing unit arranged in an air flow line of the braking system, the air flow producing unit being mechanically connected to, and operated by, the electric machine; and
    an electrical brake resistor arrangement positioned in the air flow line in fluid communication between the air flow producing unit and an ambient environment, the electrical brake resistor arrangement being electrically connected to the electric source and arranged to heat air supplied from the air flow producing unit by electrical power received from the electric source, and to supply heated air to the ambient environment.

2. The braking system of claim 1, wherein the air flow producing unit is an air compressor arranged to compress the received air and transmit the compressed air to the electrical brake resistor arrangement.

3. The braking system of claim 1, wherein the braking system further comprises an air heating arrangement positioned in fluid communication with, and upstream from, the air flow producing unit for heating the air supplied to the air flow producing unit.

4. The braking system of claim 3, wherein the air heating arrangement is formed by the electric machine, wherein air is received and heated by the electric machine and supplied to the air flow producing unit.

5. The braking system of claim 3, wherein the air heating arrangement is formed by a heat exchanger connected to a liquid cooling system.

6. The braking system of claim 1, wherein the braking system further comprises an air flow restriction arrangement positioned downstream from the electrical brake resistor arrangement.

7. The braking system of claim 6, wherein the electrical brake resistor arrangement is integrally formed with the air flow restriction arrangement.

8. The braking system of claim 1, wherein the braking system further comprises a control unit connected to the electric source and the electric machine, the control unit being configured to:
    receive a signal indicative of a current energy dissipation request from the electric source, and when the electric source requests dissipation of energy:
        control the electric machine to propel the air flow producing unit for producing a flow of air to the electrical brake resistor arrangement; and
        control the electric source to supply electric power to the electrical brake resistor arrangement for heating the air received by the electrical brake resistor.

9. The braking system of claim 8, wherein the current energy dissipation request is based on a desired energy level of the electric source at an upcoming driving position for the vehicle, wherein, before the vehicle arrives at the upcoming driving position, the control unit is configured to:
    control the electric machine to propel the air flow producing unit for producing a flow of air to the electrical brake resistor arrangement; and
    control the electric source to supply electric power to the electrical brake resistor arrangement for heating the air received by the electrical brake resistor.

10. The braking system of claim 8, wherein the control unit is further configured to:
    determine, based on the current energy dissipation request, an amount of energy to dissipate;
    determine a first maximum operational power level of the air flow producing unit;
    determine a second maximum operational power level of the electrical brake resistor arrangement; and
    control the electric machine and the electrical brake resistor arrangement to dissipate the amount of energy without exceeding the first and second maximum operational power levels.

11. The braking system of claim 8, wherein the control unit is further configured to:
    receive a signal indicative of a braking request for the vehicle; and
    control the electric machine to propel the air flow producing unit and the electric source to supply electric power to the electrical brake resistor arrangement when the vehicle requests braking.

12. A fuel cell system, comprising:
    a fuel cell stack arrangement comprising an air inlet side for receiving air to the fuel cell stack arrangement via an air inlet conduit; and
    the braking system of claim 1, wherein the air flow producing unit is connected to the air inlet conduit at a position upstream from the fuel cell stack arrangement.

13. The fuel cell system of claim 12, further comprising:
    a fuel cell air flow producing unit connected to the air inlet conduit upstream from the fuel cell stack arrangement; and
    a fuel cell electric motor mechanically connected to the fuel cell air flow producing unit;
    wherein the air flow producing unit is connected to the air inlet conduit at a position downstream from the fuel cell air flow producing unit.

14. The fuel cell system of claim 13, wherein the electrical brake resistor arrangement is arranged in downstream fluid communication with the fuel cell air flow producing unit.

15. An electrically propelled vehicle comprising the fuel cell system of claim 12, wherein the electrically propelled vehicle is arranged to receive electric power from the fuel cell system.

16. A braking system for a vehicle at least partially propelled by an electric traction motor, the braking system comprising:
   an air flow producing unit configured to generate a flow of air; and
   an electrical brake resistor arrangement positioned downstream from the air flow producing unit and arranged to receive the flow of air generated by the flow producing unit, the electrical brake resistor arrangement being electrically connected to an electric source;
   wherein the electric source is configured to supply electric power to the electrical brake resistor arrangement to heat the air received by the electrical brake resistor arrangement from the air flow producing unit.

* * * * *